US012443207B2

(12) United States Patent
Shao et al.

(10) Patent No.: US 12,443,207 B2
(45) Date of Patent: Oct. 14, 2025

(54) METHODS AND SYSTEMS FOR FILLING GAS SAFETY SUPERVISION BASED ON SMART GAS INTERNET OF THINGS (IoT)

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yunbai Chen, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/934,217

(22) Filed: Oct. 31, 2024

(65) Prior Publication Data
US 2025/0060766 A1  Feb. 20, 2025

(30) Foreign Application Priority Data
Sep. 26, 2024  (CN) .......................... 202411347736.6

(51) Int. Cl.
  *G05D 9/12* (2006.01)
  *G06Q 10/08* (2024.01)
(52) U.S. Cl.
  CPC ............... *G05D 9/12* (2013.01); *G06Q 10/08* (2013.01)
(58) Field of Classification Search
  CPC .......... G05D 9/12; G06Q 10/08; G06Q 50/06; G06Q 30/018; G06F 18/2433; G08B 21/24
  See application file for complete search history.

(56) References Cited

U.S. PATENT DOCUMENTS

2003/0187554 A1 * 10/2003 Henry ................. G07C 5/008
                                                                    702/183
2006/0167660 A1 *  7/2006 Hatch ............... G05B 23/0283
                                                                    702/185
(Continued)

FOREIGN PATENT DOCUMENTS

CN  109948973 A  6/2019
CN  109962973 A  7/2019
(Continued)

OTHER PUBLICATIONS

Ikeda, Y. English translation of JP-2019158092-A, 2019 (Year: 2019).*
(Continued)

*Primary Examiner* — Kamini S Shah
*Assistant Examiner* — Jonathan Michael Skrzycki
(74) *Attorney, Agent, or Firm* — METIS IP LLC

(57) ABSTRACT

Disclosed is a method and system for filling gas safety supervision based on smart gas Internet of Things (IoT). The method is implemented by a gas company management platform of the system. The method comprises: obtaining monitoring data of a gas filling container based on an equipment object platform; obtaining usage information of the gas filling container; determining a target gas user based on a usage index and send, based on a gas user platform, container replacement information to the target gas user, and send a parameter adjustment instruction to an electronic monitoring device of the gas filling container corresponding to the target gas user; and interacting with a public user platform based on a government safety supervision sensor network platform, a government safety supervision management platform, and a government safety supervision service platform, and displaying the container replacement information based on the public user platform.

4 Claims, 5 Drawing Sheets

(56) References Cited

U.S. PATENT DOCUMENTS

| | | | | |
|---|---|---|---|---|
| 2006/0243347 | A1* | 11/2006 | Humphrey | ............... F17C 3/00 |
| | | | | 141/95 |
| 2016/0163175 | A1* | 6/2016 | Jenkins | ............... G01G 19/414 |
| | | | | 177/1 |
| 2018/0073682 | A1* | 3/2018 | Suman | .................. G08C 17/02 |
| 2022/0333741 | A1* | 10/2022 | Buettner | ................ F17C 13/04 |
| 2023/0247138 | A1 | 8/2023 | Shao et al. | |

FOREIGN PATENT DOCUMENTS

| | | | |
|---|---|---|---|
| CN | 111652572 | A | 9/2020 |
| CN | 113222317 | A | 8/2021 |
| CN | 115511666 | A | 12/2022 |
| CN | 106949376 | B | 8/2023 |
| CN | 118654240 | A | 9/2024 |
| JP | 2007226282 | A | 9/2007 |
| JP | 2019158092 | A * | 9/2019 |
| KR | 102270449 | B1 | 6/2021 |

OTHER PUBLICATIONS

First Office Action in Chinese Application No. 202411347736.6 mailed on Nov. 8, 2024, 11 pages.

Notification to Grant Patent Right for Invention in Chinese Application No. 202411347736.6 mailed on Nov. 20, 2024, 4 pages.

\* cited by examiner

METHODS AND SYSTEMS FOR FILLING GAS SAFETY SUPERVISION BASED ON SMART GAS INTERNET OF THINGS (IoT)

CROSS-REFERENCE TO RELATED APPLICATION

This application claims priority to Chinese Patent Application No. 202411347736.6, filed on Sep. 26, 2024, the entire contents of which are hereby incorporated by reference.

TECHNICAL FIELD

The present disclosure relates to the technical field of gas filling, and in particular relates to a method and a system for filling gas safety supervision based on smart gas Internet of Things (IoT).

BACKGROUND

In the process of gas filling, the supervision of gas filling containers from production, filling, transportation to scrapping and recycling involves many departments (e.g., safety management department, quality supervision department, traffic management department, etc.), and the lack of information sharing among departments may result in the problems of expired use and illegal use (e.g., filling gas from illegal sources, etc.) of the gas filling containers not being detected and supervised in time, which may cause safety hazards.

In order to solve the above safety hazards, CN106949376B discloses a smart liquefied petroleum gas cylinder instantaneous monitoring and management platform based on satellite positioning, which enables real-time transmission of quality information, annual inspection information, location management, capacity display, leakage detection, and other information of gas cylinders, achieving real-time supervision of gas filling. However, satellite positioning may be limited by various factors, such as weather factors, the influence of buildings and terrains, problems of equipment hardware, the count of satellites, etc., which results in weak satellite signals and inability to accurately update information about the gas filling containers, affecting the accuracy of real-time supervision of the gas filling process.

Therefore, a method and a system for filling gas safety supervision based on smart gas Internet of Things (IoT) are provided to realize effective supervision of gas filling and improve the safety of gas filling.

SUMMARY

One of the embodiments of the present disclosure provides a method for filling gas safety supervision based on smart gas Internet of Things (IoT). The method may be implemented by a gas company management platform of a system for filling gas safety supervision based on smart gas Internet of Things (IoT). The method may comprise: obtaining monitoring data of a gas filling container based on an equipment object platform, the gas filling container including an electronic monitoring device; obtaining usage information of the gas filling container based on the equipment object platform; determining, based on the monitoring data and the usage information, a usage index of the gas filling container in different time periods, and sending the usage index to a gas user platform; determining a target gas user based on the usage index and send, based on the gas user platform, container replacement information to the target gas user, and send a parameter adjustment instruction to the electronic monitoring device of the gas filling container corresponding to the target gas user, the parameter adjustment instruction being configured to adjust a monitoring parameter of the electronic monitoring device; and interacting with a public user platform based on a government safety supervision sensor network platform, a government safety supervision management platform, and a government safety supervision service platform, and displaying the container replacement information based on the public user platform.

One of the embodiments of the present disclosure provides a system for filling gas safety supervision based on smart gas Internet of Things (IoT). The system may comprise a public user platform, a government safety supervision service platform, a government safety supervision management platform, a government safety supervision sensor network platform, a gas company service platform, a gas user platform, a government safety supervision object platform, a gas company sensor network platform, and an equipment object platform. The government safety supervision object platform may include a gas company management platform. The gas company management platform may be configured to: obtain monitoring data of a gas filling container based on the equipment object platform, the gas filling container including an electronic monitoring device; obtain usage information of the gas filling container based on the equipment object platform; determine, based on the monitoring data and the usage information, a usage index of the gas filling container in different time periods, and send the usage index to the gas user platform; determine a target gas user based on the usage index and send, based on the gas user platform, container replacement information to the target gas user, and send a parameter adjustment instruction to the electronic monitoring device of the gas filling container corresponding to the target gas user, the parameter adjustment instruction being configured to adjust a monitoring parameter of the electronic monitoring device; and interact with the public user platform based on the government safety supervision sensor network platform, the government safety supervision management platform, and the government safety supervision service platform, and display the container replacement information based on the public user platform.

One of the embodiments of the present disclosure provides a non-transitory computer-readable storage medium comprising computer instructions that, when read by a computer, may direct the computer to implement the method for filling gas safety supervision based on the smart gas IoT.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
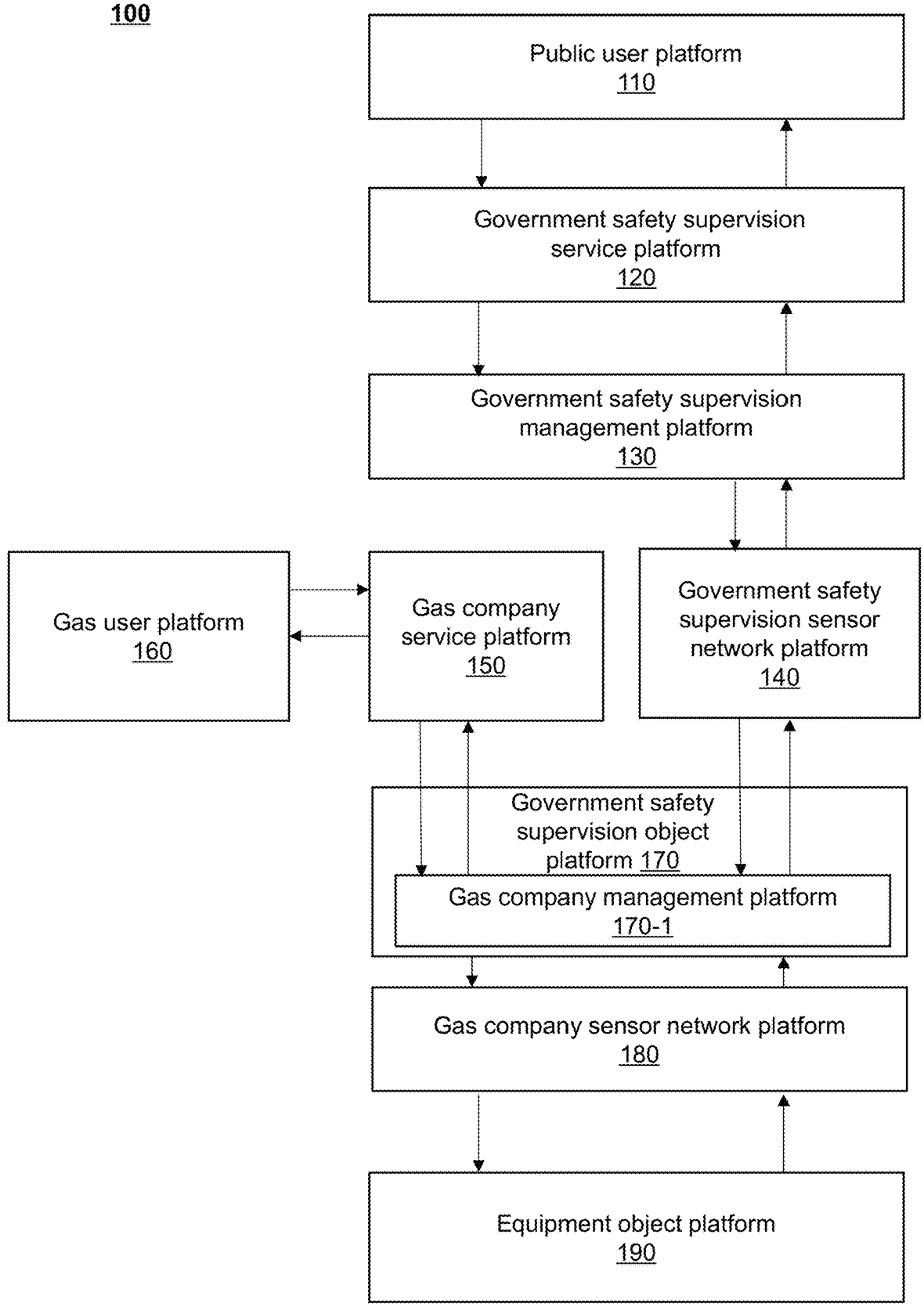
FIG. 1 is a schematic diagram illustrating an exemplary system for filling gas safety supervision based on smart gas Internet of Things (IoT) according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person having ordinary skills in the art to apply the present disclosure to other similar scenarios in accordance with these drawings without creative labor. Unless obviously obtained from the context or the context illustrates otherwise, the same numeral in the drawings refers to the same structure or operation.

It should be understood that "system", "device", "unit" and/or "module" as used herein is a method for distinguishing different components, elements, portions, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

In the process of filling gas supervision, safety hazards may be caused due to the lack of information sharing among various regulatory departments. CN106949376B can realize real-time transmission of information related to filling gas through satellite positioning, which improves the supervision effect of filling gas to a certain extent. However, the situation of a gas filling container cannot be updated when the satellite positioning signal is weak, and the influence of gas users on the gas filling process is ignored. To this end, some embodiments of the present disclosure determine a usage index of a gas filling container by combining monitoring data and usage information, and then determine a target gas user who needs to replace the gas filling container and container replacement information. In this way, a scrapped gas filling container can be accurately recognized, thereby realizing comprehensive safety management of the gas filling process, and improving the accuracy of gas filling supervision and the safety of the gas filling process.

FIG. 1 is a schematic diagram illustrating an exemplary system for filling gas safety supervision based on smart gas Internet of Things (IoT) according to some embodiments of the present disclosure.

As shown in FIG. 1, a system 100 for filling gas safety supervision based on smart gas Internet of Things (IoT) may include a public user platform 110, a government safety supervision service platform 120, a government safety supervision management platform 130, a government safety supervision sensor network platform 140, a gas company service platform 150, a gas user platform 160, a government safety supervision object platform 170, a gas company sensor network platform 180, and an equipment object platform 190.

The public user platform 110 refers to a platform orienting citizens. In some embodiments, the public user platform may be configured to display container replacement information. In some embodiments, the public user platform 110 may interact with the government safety supervision service platform 120. For example, the public user platform may receive the container replacement information uploaded by the government safety supervision service platform and display container replacement information.

The government safety supervision service platform 120 refers to a platform that provides gas supervision services to the citizens. In some embodiments, the government safety supervision service platform 120 may perform two-way interaction with the public user platform 110 and the government safety supervision management platform 130. For example, the government safety supervision service platform may obtain the container replacement information uploaded by the government safety supervision management platform and send the container replacement information to the public user platform.

The government safety supervision management platform 130 refers to a comprehensive safety management platform for government management information. In some embodiments, the government safety supervision management platform 130 may perform two-way interaction with the government safety supervision service platform 120 and the government safety supervision sensor network platform 140. For example, the government safety supervision management platform 130 may obtain the container replacement information uploaded by the government safety supervision sensor network platform and send the container replacement information to the government safety supervision service platform.

The government safety supervision sensor network platform 140 refers to a comprehensive management platform used by the government for sensor information related to safety. For example, the government safety supervision sensor network platform 140 may include a communication base station, a router, a wireless WIFI device, or the like. In some embodiments, the government safety supervision sensor network platform 140 may interact with the government safety supervision management platform 130 and the government safety supervision object platform 170. For example, the government safety supervision sensor network platform may obtain the container replacement information uploaded by the government safety supervision object platform and send the container replacement information to the government safety supervision management platform.

The gas company service platform 150 refers to a platform that provides gas supervision services for gas companies. In some embodiments, the gas company service platform may interact with the gas user platform 160 and a gas company management platform 170-1.

The gas user platform 160 refers to a platform for interacting with gas users. In some embodiments, the gas user platform may be configured as a terminal device. In some embodiments, the gas user platform 160 may perform two-way interaction with the gas company management platform 170-1 through the gas company service platform 150. For example, the gas user platform may obtain the container replacement information sent by the gas company management platform.

The government safety supervision object platform 170 refers to a platform for government supervision information generation and control information execution.

In some embodiments, the government safety supervision object platform 170 may include the gas company management platform 170-1. In some embodiments, the gas company management platform 170-1 may perform two-way interaction with the government safety supervision sensor network platform 140, the gas company service platform 150, and the gas company sensor network platform 180, respectively. For example, the gas company management platform 170-1 may obtain, through the gas company sensor network platform 180, monitoring data, usage information, or the like, uploaded by the equipment object platform 190, and send the container replacement information to the government safety supervision sensor network platform 140. As another example, the gas company management platform 170-1 may obtain, through the gas company service platform 150, the container replacement information uploaded by the gas user platform 160. In some embodiments, the gas company management platform 170-1 may be configured on a gas company management server.

In some embodiments, the gas company management platform 170-1 may be configured to obtain monitoring data of a gas filling container based on the equipment object platform 190, the gas filling container including an electronic monitoring device; obtain usage information of the gas filling container based on the equipment object platform 190; determine, based on the monitoring data and the usage information, a usage index of the gas filling container in different time periods, and send the usage index to the gas user platform 160; determine a target gas user based on the usage index, and send, based on the gas user platform 160, the container replacement information to the target gas user, and send a parameter adjustment instruction to the electronic monitoring device of the gas filling container corresponding to the target gas user, the parameter adjustment instruction being configured to adjust a monitoring parameter of the electronic monitoring device; and interact with the public user platform 110 based on the government safety supervision sensor network platform 140, the government safety supervision management platform 130, and the government safety supervision service platform 120, and display the container replacement information based on the public user platform 110.

The gas company sensor network platform 180 refers to a platform used by a gas company for sensor communication with the equipment object platform 190. For example, the gas company sensor network platform 180 may include a communication base station, a router, a wireless WIFI device, or the like. In some embodiments, the gas company sensor network platform 180 may perform two-way interaction with the gas company management platform 170-1 and the equipment object platform 190.

The equipment object platform 190 refers to a functional platform for perceptual information generation and control information execution. In some embodiments, the equipment object platform 190 may be configured at a gas gate station, a gas field station, a gas pressure regulation station, a valve well, a refueling station, or an appurtenant facility to a gas pipeline network. In some embodiments, the equipment object platform 190 may interact with an electronic monitoring device of the gas filling container to obtain the monitoring data monitored by the electronic monitoring device.

In some embodiments, the system 100 for filling gas safety supervision based on the smart gas IoT may further include a multi-level network, such as a primary network and a secondary network, etc. For example, the primary network may include a primary network user platform, a primary network service platform, a primary network management platform, a primary network sensor network platform, and a primary network object platform. As another example, the secondary network may include a secondary network user platform, a secondary network service platform, a secondary network management platform, a secondary network sensor network platform, and a secondary network object platform. The various platforms of the system 100 for filling gas safety supervision based on the smart gas IoT may correspond to different functions in different levels of networks. For example, when the government safety supervision object platform 170 is in the primary network, functions of the object platform may be realized, and when the government safety supervision object platform 170 is in the secondary network, the gas company management platform included in the government safety supervision object platform 170 may realize a management function, etc.

More descriptions regarding the functions of the system 100 for filling gas safety supervision based on the smart gas IoT may be found in the related descriptions of FIGS. 2-5.

In some embodiments of the present disclosure, the system for filling gas safety supervision based on the smart gas IoT can form a closed loop of information operation between functional platforms for coordinated and regular operation, so as to realize the informatization and intelligence of filling gas supervision.

Figure 2:
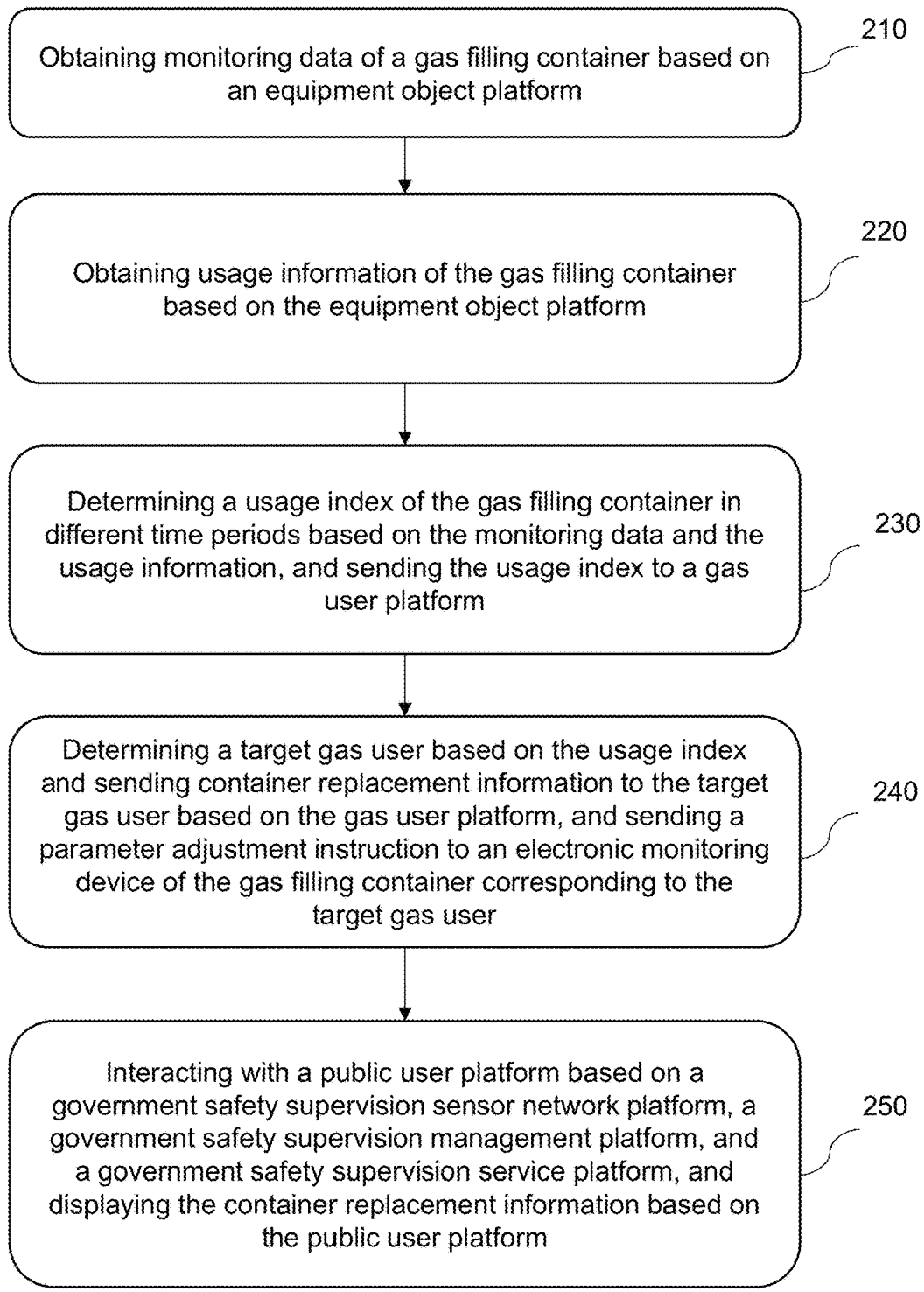
FIG. 2 is a flowchart illustrating an exemplary method for filling gas safety supervision based on smart gas Internet of Things (IoT) according to some embodiments of the present disclosure.

FIG. 2 is a flowchart illustrating an exemplary method for filling gas safety supervision based on smart gas Internet of Things (IoT) according to some embodiments of the present disclosure. In some embodiments, a process 200 may be performed by the gas company management platform 170-1 of the system 100 for filling gas safety supervision based on the smart gas IoT. As shown in FIG. 2, the process 200 may include the following operations.

In 210, monitoring data of a gas filling container may be obtained based on an equipment object platform.

The gas filling container refers to a container used to store and transport gas (e.g., natural gas, liquefied petroleum gas, etc.). For example, the gas filling container may include, a liquefied petroleum gas cylinder, or other gas cylinders, etc.

In some embodiments, the gas filling container may include an electronic monitoring device.

The electronic monitoring device refers to an electronic device for monitoring the gas filling container. For example, the electronic monitoring device may include various sensors such as a hydraulic sensor, a temperature sensor, or the like, and a positioning chip, a data acquisition unit, a communication module, etc. The data acquisition unit refers to a basic unit used for collecting the monitoring data. The communication module refers to a functional module for communication transmission of the electronic monitoring device through a network. In some embodiments, the electronic monitoring device may be configured to collect and transmit the monitoring data in real time.

The monitoring data refers to monitored data related to a status of the gas filling container. For example, the monitoring data may include, but is not limited to, positioning information, a filling pressure, a usage temperature, or the like, of the gas filling container.

The positioning information refers to information related to positioning of the gas filling container. The positioning information may be configured to determine a location of the gas filling container.

The filling pressure refers to a gas pressure inside the gas filling container, which may be used to determine whether the gas filling container has an overfilling situation. For example, when the filling pressure is greater than a maximum pressure value, the overfilling situation may be determined. The maximum pressure value may be determined by a technician.

The usage temperature refers to a temperature of the gas filling container. The usage temperature may be configured to determine whether the gas filling container has an excessive temperature and creates a safety hazard. For example, when the usage temperature is greater than a maximum temperature value, the safety hazard is created. The maximum temperature value may be determined by the technician.

In some embodiments, the monitoring data may be obtained via the electronic monitoring device. For example, the positioning information may be obtained via a positioning chip disposed in the gas filling container. The filling pressure may be obtained by a hydraulic sensor disposed in the gas filling container. The usage temperature may be obtained by a temperature sensor disposed in the gas filling container.

In some embodiments, the gas company management platform may obtain the monitoring data of the gas filling container from the equipment object platform based on a gas company sensor network platform. More descriptions regarding the equipment object platform may be found in FIG. 1 and related descriptions thereof.

In some embodiments, the gas company management platform may interact with the equipment object platform based on the gas company sensor network platform to obtain the monitoring data transmitted by the electronic monitoring device to the equipment object platform through the communication module or other feasible IoT technology.

In 220, usage information of the gas filling container may be obtained based on the equipment object platform.

The usage information refers to data related to the gas filling container during actual use. For example, the usage information may include a use time, a filling time, a count of times of filling, a gas supply rate, a gas alarm record, ventilation data, or the like, of the gas filling container. In some embodiments, the electronic monitoring device may also include a gas alarm, a wind pressure sensor, etc. The gas alarm record may be monitored and obtained by the gas alarm, and the ventilation data may be monitored and obtained by the wind pressure sensor.

In some embodiments, the usage information may include first usage information and second usage information. More descriptions may be found in FIG. 3 and related descriptions thereof.

In some embodiments, the usage information may be uploaded by a gas user or collected by the electronic monitoring device. In some embodiments, the gas company management platform may interact with the equipment object platform based on the gas company sensor network platform to obtain the usage information uploaded by the equipment object platform. In some embodiments, the gas company management platform may interact with a gas user platform based on a gas company service platform to obtain the usage information uploaded by the gas user. More descriptions regarding the equipment object platform may be found in FIG. 1 and related descriptions thereof.

In 230, a usage index of the gas filling container in different time periods may be determined based on the monitoring data and the usage information, and the usage index may be sent to a gas user platform.

Different time periods refer to different time periods for determining the usage index of the gas filling container. Durations of the different time periods may be preset by the system or manually. For example, the durations of the different time periods may be a week, a month, etc. In some embodiments, the durations of the different time periods may be determined based on a usage frequency of the gas filling container. For example, the higher the usage frequency, the shorter the durations.

The usage frequency of the gas filling container refers to frequency at which the gas filling container is used. In some embodiments, the gas company management platform may determine the usage frequency based on the usage information. For example, the gas company management platform may determine a count of times of use per unit time period in the usage information as the usage frequency. The unit time period may be preset by the system or manually. For example, the unit time period may be a week, etc.

The usage index refers to a comprehensive indicator that assesses a use status of the gas filling container and a level of risk, and may be configured to measure the probability of failure of the gas filling container. In some embodiments, the usage index may be expressed by a numerical value. The higher the numerical value of the usage index, the more normal the use status of the gas filling container, the lower the level of risk, and the lower the probability of failure.

In some embodiments, the gas company management platform may determine, based on the monitoring data and the usage information, the usage index of the gas filling container in different time periods in various ways.

In some embodiments, the gas company management platform may determine the usage index through a first preset rule based on the monitoring data and the usage information.

The first preset rule refers to a rule preset for determining the usage index. For example, the first predetermined rule may be that: the more occurrences of anomaly data in the monitoring data and the usage information in a certain time period, the lower the usage index of the gas filling container of the time period.

The anomaly data refers to data that has an anomaly in the monitoring data and the usage information. In some embodiments, the gas company management platform may determine the monitoring data and the usage information that satisfy a preset anomaly condition as the anomaly data. The preset anomaly condition refers to a preset condition for determining the anomalous data. The preset anomaly condition may be determined by a technician. For example, the preset anomaly condition may include the filling pressure being greater than the maximum pressure value, the use temperature being greater than the maximum temperature value, the ventilation data not satisfy standard ventilation data, or the like. The standard ventilation data may be preset by the technician. More descriptions regarding the maximum pressure value and the maximum temperature value may be found in the FIG. 2 above.

For example, the first preset rule may include the following formula: the usage index=the usage index of a previous time period−$(k_1 \times A \times a + k_2 \times B \times b + \ldots + k_n \times N \times n)$.

The usage index of the previous time period refers to a usage index of the gas filling container in the previous time period. The previous time period refers to a time period closest to the current time period of the different time periods corresponding to the usage index. As for the usage index of the gas filling container of a first time period, i.e., the usage index of a time period when the gas filling container is used for the first time, the usage index of the previous time period is an initial usage index. The initial usage index refers to a usage index of the gas filling container in an initial status. The initial usage index may be preset by the system or manually. A, B, and N denote usage index reduction values corresponding to different types of monitoring data and/or usage information. The usage index reduction values corresponding to different types of monitoring data and/or usage information may be the same or different, and the usage index reduction values may be determined based on historical experience. a, b, and n denote the count of times the anomaly data appearing in the different types of monitoring data and/or usage information. $k_1$, $k_2$, and kn denote weight coefficients corresponding to different types of monitoring data and/or usage information. The weight coefficients may be determined based on historical experience.

For example, an initial usage index is 100, 10 instances of anomaly data occur in the ventilation data and 20 instances of anomaly data occur in the filling temperature during the first time period, the usage index reduction value corresponding to the ventilation data is 1, the usage index reduction value corresponding to the filling temperature is 0.5, the weight coefficient corresponding to the ventilation data is 0.5, and the weight coefficient corresponding to the filling temperature is 0.4, then the usage index of the first time period=100−(0.5×1×10+0.4×0.5×20)=91; and so on, if the ventilation data in the next time period (i.e., a second time period) of the first time period has 10 instances of anomaly data, the usage index for the second time period=91−0.5×1×10=86.

In some embodiments, the gas company management platform may interact with the gas user platform to send the usage index to the gas user platform. More descriptions regarding the gas user platform may be found in FIG. 1 and related descriptions thereof.

In 240, a target gas user may be determined based on the usage index and container replacement information may be sent to the target gas user based on the gas user platform, and a parameter adjustment instruction may be sent to an electronic monitoring device of the gas filling container corresponding to the target gas user.

The target gas user refers to a user who needs to replace the gas filling container or whose gas filling container has a safety hazard.

In some embodiments, the gas company management platform may determine the target gas user based on the usage index in various ways.

For example, the gas company management platform may determine a gas user corresponding to the gas filling container with the usage index below a safety threshold as the target gas user. The safety threshold refers to a threshold condition for determining the target gas user, and may be determined by the technician.

In some embodiments, the gas company management platform may obtain maintenance data of the gas filling container; determine an index change trend based on the maintenance data, the monitoring data, the usage information, and the usage index; determine a potential gas user based on the index change trend and a first change threshold; and determine the target gas user based on a first usage intensity of the gas filling container corresponding to the potential gas user. More descriptions may be found in FIG. 3 and related descriptions thereof.

The container replacement information refers to information related to reminding the target gas user to replace the gas filling container used. For example, the container replacement information may include an operation guide, a safety tip, or the like. The operation guide refers to a guide related to how to replace the gas filling container, which may include how to obtain a new gas filling container, how to dispose of a gas filling container that is being utilized, contact information for a technician, etc. The safety tip refers to a tip related to the safety hazards of the gas filling container, which may include possible risks and advice on how to address the risks, tips related to how to stay safe while replacing the gas filling container, etc.

In some embodiments, the container replacement information may be determined by the technician.

In some embodiments, the gas company management platform may interact with the gas user platform based on the gas company service platform, and send the container replacement information to the gas user platform corresponding to the target gas user.

The parameter adjustment instruction refers to an instruction related to the adjustment of a monitoring parameter of the electronic monitoring device.

The monitoring parameter refers to a parameter related to monitoring performed by the electronic monitoring device. For example, the monitoring parameter may include a monitoring frequency, a waning intensity of the electronic monitoring device, etc.

In some embodiments, the gas company management platform may automatically generate the parameter adjustment instruction. For example, the parameter adjustment instruction generated by the gas company management platform may be to increase the monitoring frequency, increase the warning intensity, or the like.

In some embodiments, the gas company management platform may interact with the electronic monitoring device and send the parameter adjustment instruction to the electronic monitoring device.

In 250, interaction with a public user platform may be performed based on a government safety supervision sensor network platform, a government safety supervision management platform, and a government safety supervision service platform, and the container replacement information may be displayed based on the public user platform.

In some embodiments, the gas company management platform may interact with the public user platform based on the government safety supervision sensor network platform, the government safety supervision management platform, and the government safety supervision service platform. More descriptions regarding the government safety supervision sensor network platform, the government safety supervision management platform, the government safety supervision service platform, and the public user platform may be found in FIG. 1 and related descriptions thereof.

In some embodiments, the gas company management platform may display the container replacement information based on the public user platform in various feasible ways, such as through a picture, a text, a voice, etc.

In some embodiments, the gas company management platform may determine, based on the monitoring data and/or the usage information, whether the monitoring data and/or the usage information satisfy a second preset condition through a second model; and in response to determining that the monitoring data and/or the usage information satisfy the second preset condition, adjust the target gas user. The adjusted target gas user refers to a target gas user after adjustment of an initially determined target gas user. For example, the adjusted target gas user may include a target gas user after an addition or deletion is made to the initially determined target gas user.

The second model refers to a model for determining whether the monitoring data and/or the usage information satisfy the second preset condition. In some embodiments, the second model may be a machine learning model, such as a Neural Networks (NN) model, or the like.

The second preset condition refers to a determination condition for determining whether to adjust the target gas user. In some embodiments, the second preset condition may include a preset addition condition and a preset deletion condition. The preset addition condition refers to a preset condition for determining whether to add the target gas user. The preset deletion condition refers to a preset condition for determining whether to delete the target gas user. In some embodiments, the second preset condition may be preset by the system or manually. For example, the preset addition condition in the second preset condition may include that a count of occurrences of anomaly data of the gas filling container used by other gas users in a subsequent time period is greater than a preset value, the filling pressure has an anomaly fluctuation, the usage index is lower than a safety threshold, etc. Other gas users refer to gas users other than the target gas user. As another example, the preset deletion condition in the second preset condition may include that the gas filling container used by the target gas user has a usage index higher than the safety threshold for a subsequent time period, the gas supply rate is continuously 0, the filling pressure is continuously lower than the maximum pressure value, etc. The subsequent time period refers to a certain time period after the target gas user is determined. The subsequent time period may be preset by the system or manually.

In some embodiments, an input of the second model may include the monitoring data and/or the usage information; and an output of the second model may include a determination result of whether the monitoring data and/or the usage information satisfies the second preset condition.

In some embodiments, the second model may be obtained by training based on first training samples with first labels. For example, a plurality of first training samples with the first labels may be input into an initial second model, a loss function may be constructed from the first labels and results of the initial second model, and parameters of the initial second model may be updated iteratively based on the loss function via gradient descent or other methods. The model training may be completed when a preset iteration condition is satisfied, and a trained first model may be obtained. The preset iteration condition may include convergence or stabilization of the loss function, or the like.

In some embodiments, each of the plurality of first training samples may include sample monitoring data and sample usage information, and the plurality of first training samples may be obtained through historical data. In some embodiments, the first labels may include actual determination results corresponding to the first training samples. The first labels may include a numerical value of 0 or 1, where a first label of 1 represents that the corresponding first training sample satisfies the second preset condition, and a first label of 0 represents that the corresponding first training sample does not satisfy the second preset condition. The first labels may be obtained by visiting and surveying the gas users (e.g., surveying whether the gas users corresponding to the first training samples are added as the target gas users or deleted from the target gas users), or may be obtained through a simulation experiment or historical data.

In some embodiments, in response to determining that the monitoring data and/or the usage information satisfies the second preset condition, the gas company management platform may adjust the target gas user. For example, the gas company management platform may delete a target gas user corresponding to the gas filling container of which the monitoring data and/or the usage information satisfies the preset deletion condition in the second preset condition. As another example, the gas company management platform may add other gas users corresponding to the gas filling container of which the monitoring data and/or the usage information satisfy the preset addition condition in the second preset condition as the target gas users.

In some embodiments, the gas company management platform may obtain an intensity change trend of the gas filling container corresponding to the gas user based on a second usage intensity of the gas filling container corresponding to the gas user; and in response to determining that the intensity change trend satisfies a preset change condition, add the gas user corresponding to the intensity change trend as the target gas user. More descriptions may be found in the related descriptions of FIG. 5.

According to some embodiments of the present disclosure, whether the monitoring data and/or the usage information satisfy the second preset condition is determined using the second model, and then the target gas user is adjusted, such that a pattern is found from a large amount of data using the self-learning ability of machine learning to more accurately and comprehensively determine and adjust the target gas user, thereby improving the flexibility and adaptability of determining the target gas user.

According to some embodiments of the present disclosure, the usage index of the gas filling container in different time periods is determined through the monitoring data and the usage information, and then the target gas user is determined and the container replacement information is sent to the target gas user, such that filling gas safety supervision can be realized, and the target gas user can be reminded to replace the gas filling container in time, thereby avoiding safety hazards caused by aging or improper use of the gas filling container.

Figure 3:
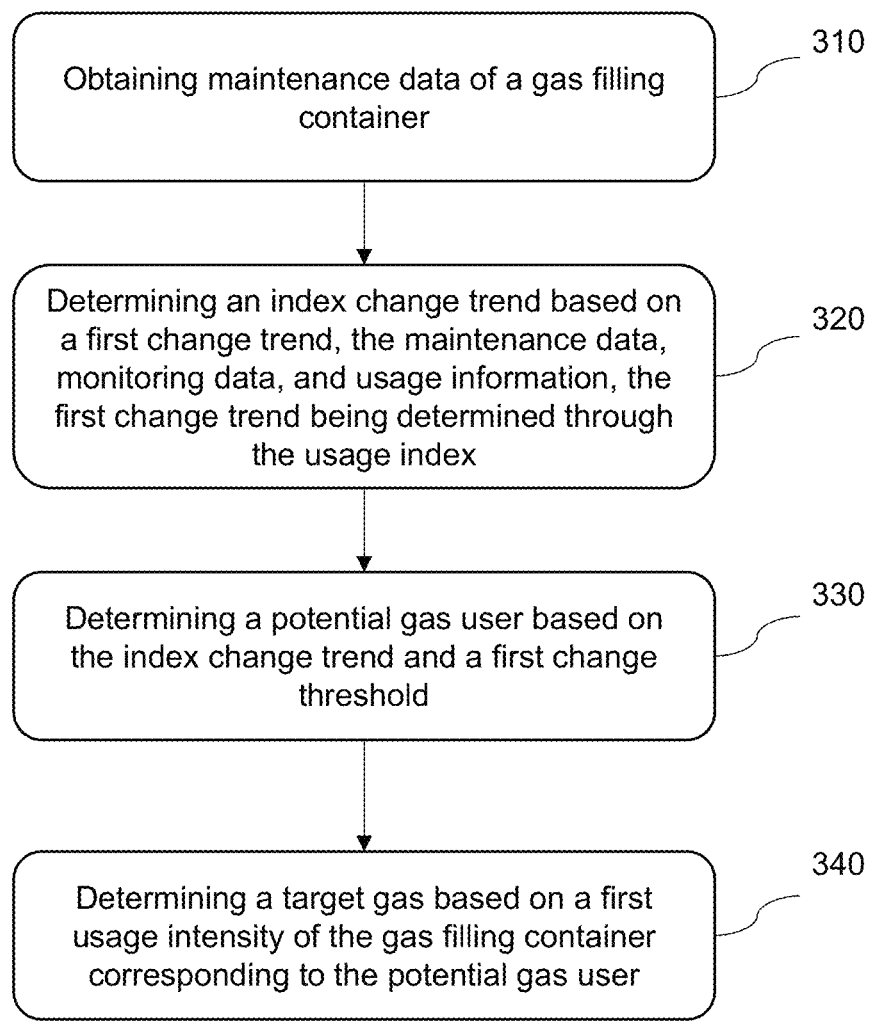
FIG. 3 is a flowchart illustrating an exemplary process of determining a target gas user according to some embodiments of the present disclosure.

FIG. 3 is a flowchart illustrating an exemplary process of determining a target gas user according to some embodiments of the present disclosure. In some embodiments, a process 300 may be performed by the gas company management platform 170-1 of the system 100 for filling gas safety supervision based on the smart gas IoT. As shown in FIG. 3, the process 300 may include the following operations.

In 310, maintenance data of a gas filling container may be obtained. More descriptions regarding the gas filling container may be found in FIG. 2 and related descriptions thereof.

The maintenance data refers to information related to historical maintenance data of the gas filling container. For example, the maintenance data may include, but is not limited to, a historical maintenance time, a count of times of maintenance, a reason for maintenance, or the like, of the gas filling container.

In some embodiments, the gas company management platform may obtain the maintenance data in historical data from a storage device. The maintenance data may be input and stored in the storage device by a gas user and/or a maintenance technician.

In 320, an index change trend may be determined based on a first change trend, the maintenance data, monitoring data, and usage information, the first change trend being determined through the usage index. More descriptions regarding the monitoring data and the usage information may be found in FIG. 2 and related descriptions thereof.

The first change trend refers to a change trend of the usage index from a previous time period to a current time period. The previous time period refers to the closest time period of different time periods corresponding to the usage index to the current time period.

In some embodiments, the gas company management platform may determine the first change trend based on the usage index of different time periods in various ways. For example, the gas company management platform may determine a ratio of a usage index difference to the usage index of the previous time period as the first change trend. The usage index difference refers to a value of the usage index of the current time period minus the usage index of the previous time period. The usage index of the current time period may be determined in a manner similar to the manner in which the usage index is determined in FIG. 2 above, which may be found in the related descriptions FIG. 2 above. The count of times of anomaly data occurring in the current time period refers to a count of occurrences of anomaly data from the end of the previous time period to the current time.

The index change trend refers to a change trend of the usage index of the gas filling container. More descriptions regarding the usage index may be found in FIG. 2 and related descriptions thereof.

In some embodiments, the gas company management platform may determine the index change trend based on the first change trend, the maintenance data, the monitoring data, and the usage information in various ways.

For example, the gas company management platform may determine the first change trend based on the usage index, and determine the index change trend based on a correction factor corresponding to the maintenance data, the monitoring data, and the usage information, respectively. For example, the gas company management platform may determine the index change trend by the following formula: the index change trend=the first change trend−the correction factor corresponding to the maintenance data−the correction factor corresponding to the monitoring data−the correction factor corresponding to the usage information.

In some embodiments, the gas company management platform may determine the correction factor based on the maintenance data, the monitoring data, and the usage information in various ways. For example, the gas company management platform may determine the correction factor based on the historical data through a second preset rule. The second preset rule refers to a preset rule for determining the correction factor. The exemplary second preset rule may include that: the more the count of maintenance of the maintenance data in the historical data and the longer the historical maintenance time, the larger the correction factor corresponding to the maintenance data; the more the anomaly data of the monitoring data in the historical data, the larger the correction factor corresponding to the monitoring data; the more the anomaly data of the usage information in the historical data, the larger the correction factor corresponding to the monitoring data. More descriptions regarding the anomaly data may be found in FIG. 2 and related descriptions thereof.

The maintenance data, the monitoring data, and the usage information all affect the probability of failure of the gas filling container. For example, the more the count of maintenance, and the more the anomaly data in the monitoring data and the usage information, the higher the probability of failure of the gas filling container. Therefore, according to some embodiments of the present disclosure, by introducing the correction factor corresponding to the maintenance data, the monitoring data, and the usage information, respectively, to correct the first change trend, and then determining the index change trend, the change trend of the usage index can be more accurately reflected, making the index change trend more in line with the actual situation, thereby improving the accuracy of the subsequent determination of a potential gas user.

In 330, a potential gas user may be determined based on the index change trend and a first change threshold.

The first change threshold refers to a first threshold condition for determining the potential gas user. In some embodiments, the first change threshold may be preset by the system or manually. The potential gas user refers to a gas user that may become the target gas user.

In some embodiments, the first change threshold may be related to a climate change feature in a preset time period.

The preset time period refers to a preset time period in historical time, such as the last week etc. The preset time period may be preset by the system or manually.

The climate change feature refers to feature information related to a climate change. For example, the climate change feature may include an average change value of temperature, an average change value of humidity, an average change value of wind, etc.

In some embodiments, the gas company management platform may determine the climate change feature by calculation based on historical climate data. The historical climate data refers to historical data related to climate, such as historical temperature, historical humidity, historical wind, etc. In some embodiments, the gas company management platform may obtain the historical climate data in various ways, such as through a storage device or by querying a climate website.

For example, the gas company management platform may calculate absolute values of temperature differences of a plurality of adjacent historical times and determine an average of the plurality of absolute values of the temperature differences as an average change value of temperature. Other climate change features, such as the average change value of humidity, the average change value of wind, or the like, may be calculated in a manner similar to the calculation of the average change value of temperature.

In some embodiments, the larger the average change value of individual climate data (e.g., temperature, humidity, wind, etc.) of the climate change feature, the larger the climate change feature, and the smaller the first change threshold.

The greater the degree of climate change, the greater the uncertain factor in the use of the gas filling container, which is more likely to cause failure loss of the gas filling container. According to some embodiments of the present disclosure, by correlating the first change threshold to the climate change feature, the first change threshold can be reduced when the climate change feature is large, and thus the potential gas user corresponding to the gas filling container that may have the failure loss leading to a safety hazard can be comprehensively determined, which is conducive to subsequently determining the target gas users more accurately.

In some embodiments, the gas company management platform may determine the potential gas user based on the index change trend and the first change threshold in various ways. For example, the gas company management platform may determine a gas user corresponding to the gas filling container of which the absolute value of the index change trend exceeds the first change threshold as the potential gas user.

In some embodiments, the gas company management platform may determine a second change threshold based on an intensity change trend of a plurality of gas filling containers; and determine the potential gas user based on the index change trend, the first change threshold, and the second change threshold.

The second change threshold refers to a second threshold condition for determining the potential gas user based on a second change trend. More descriptions regarding the second change trend and more descriptions regarding determining the second change trend may be found in FIG. 4 and related descriptions thereof.

In some embodiments, the gas company management platform may determine the second change threshold based on the intensity change trend of the plurality of gas filling containers in various ways.

The intensity change trend refers to a change trend of a second usage intensity of the gas filling container corresponding to the gas user. More descriptions regarding the gas user may be found in FIG. 1 and related descriptions thereof. More descriptions regarding the intensity change trend and the second usage intensity may be found in FIG. 5 and related descriptions thereof.

For example, the gas company management platform may calculate an average of the intensity change trends of the plurality of gas filling containers and determine, based on the average, the second change threshold through a third preset rule. The third preset rule refers to a preset rule for determining the second change threshold. The exemplary third preset rule may be that the greater the average of the intensity change trend, the smaller the second change threshold.

In some embodiments, the gas company management platform may determine the potential gas user based on the index change trend, the first change threshold, and the second change threshold in various ways. For example, the gas company management platform may determine a gas user corresponding to the gas filling container of which the absolute value of the first change trend in the index change trend is higher than the first change threshold and the absolute value of the second change trend in the index change trend is higher than the second change threshold as the potential gas user.

According to some embodiments of the present disclosure, the second change threshold is determined through the intensity change trend and the potential gas user is determined based on the index change trend, the first change threshold, and the second change threshold, so as to determine as many potential gas users as possible in combination with the second change trend in a future time period in case of an increase in the overall second usage intensity in a gas market, which improves the comprehensiveness of determining the target gas user, and avoids more safety hazards.

In 340, a target gas user may be determined based on a first usage intensity of the gas filling container corresponding to the potential gas user.

The first usage intensity refers to a usage intensity of the gas filling container by the potential gas user, and may be configured to measure a usage situation of the gas filling container by the potential gas user.

In some embodiments, the gas company management platform may determine the first usage intensity in various ways. For example, the gas company management platform may determine the first usage intensity based on the usage information through a fourth preset rule. The fourth preset rule refers to a preset rule for determining the first usage intensity. Exemplary fourth preset rule may include that: the longer the use time in the usage information, the higher the gas supply rate, and the higher the wear degree of devices on the gas filling container, the higher the first usage intensity. The wear degree of devices may be uploaded to the gas company management platform by the potential gas user through the gas user platform.

In some embodiments, the first usage intensity may be determined based on gas consumption data.

The gas consumption data refers to data related to gas consumption. For example, the gas consumption data may include a total gas usage, a change rate of the gas supply rate, or the like.

In some embodiments, the gas consumption data may be determined based on the usage information in various ways. In some embodiments, the gas company management platform may establish a gas consumption curve based on the usage information, where a horizontal axis of the gas consumption curve denotes the use time, and a vertical axis of the gas consumption curve denotes the gas supply rate. In some embodiments, the gas company management platform may determine a constant integral result of the gas consumption curve as the total gas usage in the gas consumption data, and determine the change rate of the gas supply rate in the gas consumption data by calculating a slope of the gas consumption curve. For example, the gas company management platform may divide the gas consumption curve into a preset count of sub-intervals, determine a slope of each sub-interval, and determine a variance of the slopes of all the sub-intervals as the change rate of the gas supply rate. The slope of each sub-interval slope refers to an average of the slopes of the gas consumption curve within the sub-intervals. The preset count may be preset by the system or manually.

In some embodiments, the gas company management platform may determine the first usage intensity based on the gas consumption data through a fifth preset rule. The fifth preset rule refers to a preset rule for determining the first usage intensity based on the gas consumption data. The exemplary fifth preset rule may be that the greater the total gas usage in the gas consumption data and the higher the change rate of the gas supply rate, the higher the corresponding first usage intensity. The exemplary fifth preset rule may be that: the first usage intensity=m*the total gas usage+n*the change rate of the gas supply rate, where m and n denote preset values, which may be determined based on historical experience.

According to some embodiments of the present disclosure, the first usage intensity is determined through the gas consumption data, and the accurate first usage intensity can be determined from various aspects such as the gas usage, the gas pressure regulation frequency, and so on, which is conducive to the subsequent determination of the target gas user.

In some embodiments, the gas company management platform may determine the target gas user based on the first usage intensity of the gas filling container corresponding to the potential gas user in various ways. For example, the gas company management platform may rank the potential gas users based on magnitudes of the first usage intensities in a descending order, and determine the potential gas users with preset top rankings as the target gas users. The preset ranking may be preset based on historical experience.

According to some embodiments of the present disclosure, the index change trend is determined based on the maintenance data, the monitoring data, the usage information, and the usage index, and then the target gas user is determined, which determine the more comprehensive target gas user based on various factors, thereby ensuring time replacement of the gas filling container with potential safety hazards, and improving the safety and comprehensiveness of gas filling supervision.

Figure 4:
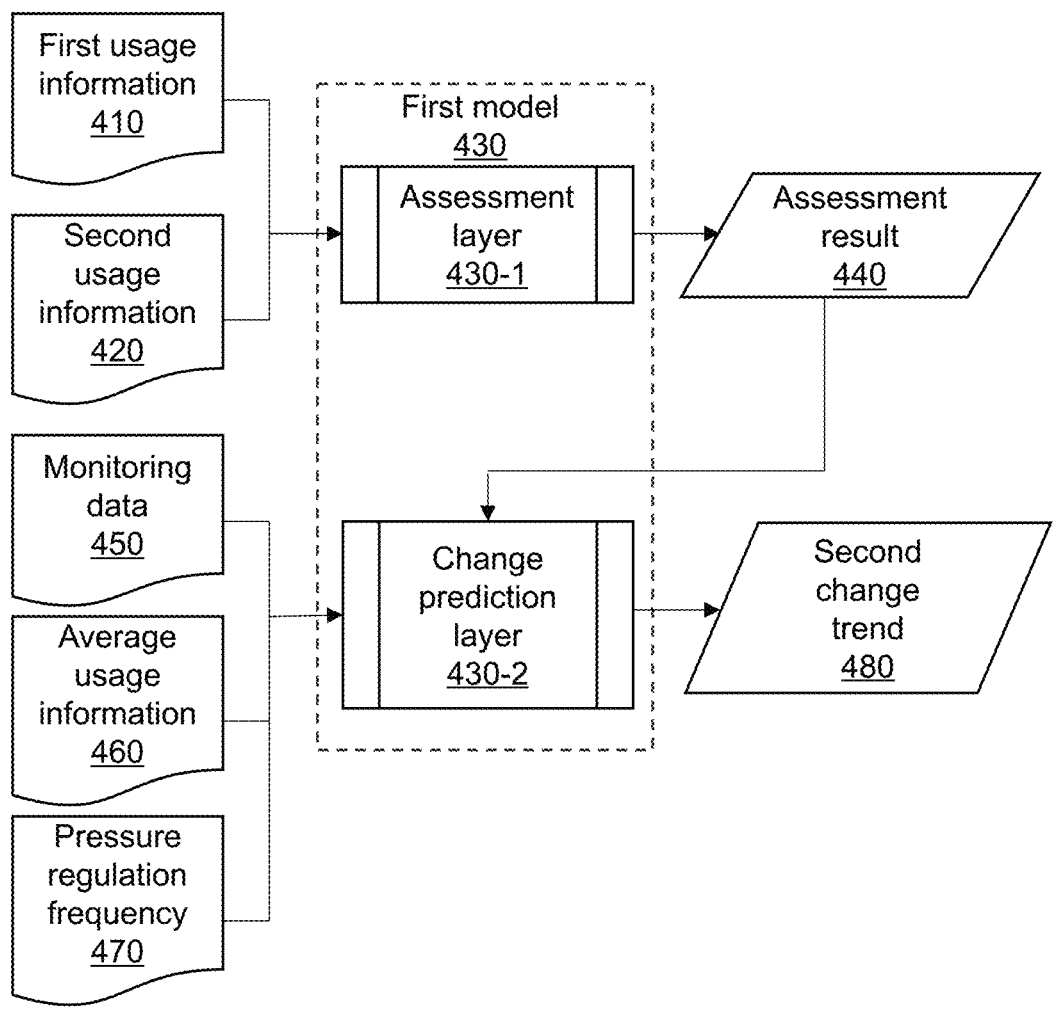
FIG. 4 is a schematic diagram illustrating an exemplary first model according to some embodiments of the present disclosure.

FIG. 4 is a schematic diagram illustrating an exemplary first model according to some embodiments of the present disclosure.

In some embodiments, usage information may include first usage information and second usage information. An index change trend may include a second change trend. A gas company management platform may determine a second change trend 480 through a first model 430 based on first usage information 410 and second usage information 420.

The first usage information 410 refers to usage information actively uploaded by a gas user. For example, the first usage information may include a use time, a filling time, a count of times of filling, or the like, of a gas filling container during actual use.

The second usage information 420 refers to usage information of the gas filling container monitored by an electronic monitoring device. For example, the second usage information may include a filling time, a use time, a gas supply rate, a gas alarm record, or the like, of the gas filling container monitored by the electronic monitoring device. More descriptions regarding the electronic monitoring device, the use information, and the access thereto may be found in the corresponding descriptions of FIG. 2.

The second change trend refers to change rates of a plurality of predicted usage indexes over a future time period. The future time period refers to a future time period from the current time. In some embodiments, the future time period may be manually preset or set by system default, such as a week in the future, a month in the future, etc.

The first model 430 refers to a model for determining the second change trend. In some embodiments, the first model may be a machine learning model, such as a neural network model, etc.

In some embodiments, an input of the first model 430 may include the first usage information and the second usage information, and an output of the first model 430 may be the second change trend.

In some embodiments, the gas company management platform may train the first model based on a plurality of second training samples with second labels. The training process of the first model may be similar to that of a second model, which may be found in the related descriptions of FIG. 2.

In some embodiments, the second training samples may include sample first usage information and sample second usage information. The second labels may include change rates of actual usage indexes over the future time period corresponding to the second training samples. The second training samples and the second labels may be obtained from historical data.

In some embodiments, as shown in FIG. 4, the first model 430 may include an assessment layer 430-1 and a change prediction layer 430-2. The gas company management platform may determine, based on the first usage information 410 and the second usage information 420, an assessment result 440 through the assessment layer 430-1, and determine, based on the assessment result 440, monitoring data 450, average usage information 460, and a pressure regulation frequency 470, a second change trend 480 through the change prediction layer 430-2. More descriptions regarding the monitoring data may be found in FIG. 2 and related descriptions thereof.

The assessment layer 430-1 refers to a model for determining the assessment result. In some embodiments, the assessment layer may be a machine learning model, such as a deep neural networks (DNN) model, etc.

In some embodiments, an input the assessment layer may include the first usage information and the second usage information, and an output of the assessment layer may include the assessment result.

The assessment result 440 refers to an assessment result of a degree of consistency between the first usage information and the second usage information. The assessment result may be configured to verify and/or determine whether there is an omission, concealment, misreporting, etc. by the gas user.

In some embodiments, the assessment result may be a specific value within a preset interval, and the higher the value of the assessment result, the higher the degree of consistency between the first usage information and the second usage information. The preset interval (e.g., 0-1, etc.) may be preset by the system or manually, and the gas company management platform may also adjust the preset interval in other feasible ways, such as linear transformation.

The change prediction layer 430-2 refers to a model for determining the second change trend. In some embodiments, the change prediction layer may be a machine learning model, such as a neural network model, etc.

In some embodiments, an input of the change prediction layer may include the assessment result 440, the monitoring data 450, the average usage information 460, and the pressure regulation frequency 470, and an output of the change prediction layer may include the second change trend 480.

The average usage information 460 refers to an average of the first usage information and the second usage information. In some embodiments, the gas company management platform may obtain the average usage information by averaging the same type of the first usage information and the second usage information. For example, if the use time in the first usage information is 24 h and the use time in the second usage information is 26 h, the use time in the average usage information is 25 h.

The pressure regulation frequency refers to a frequency at which the gas filling container undergoes pressure regulation. In some embodiments, the gas company management platform may determine a count of times of pressure regulation of the gas filling container per unit time as the pressure regulation frequency. The unit time may be preset by the system or manually.

In some embodiments, the gas company management platform may obtain the first model by joint training based on a plurality of third training samples with third labels.

In some embodiments, the third training samples may include sample first usage information, sample second usage information, sample monitoring data, sample average usage information, and a sample pressure regulation frequency. The third labels may include actual assessment results and change rates of actual usages indexes of a future time period corresponding to the third training samples. The third training samples may be obtained from historical data. The actual assessment results refer to actual assessment results of the sample first usage information and the sample second usage information corresponding to the third training samples in the same time period, and the third label may be labeled manually. The process of joint training may include: inputting the sample first usage information and the sample second usage information in the third training samples into the assessment layer, and obtaining the assessment result outputted by the assessment layer; inputting the assessment result outputted by the assessment layer, the sample monitoring data, the sample average usage information, and the sample pressure regulation frequency into the change prediction layer, and obtaining the second change trend outputted by the change prediction layer; and construct a first loss function from the actual assessment results in the third labels and the output of the assessment layer, and constructing a second loss function from the change rates of the actual usage indexes in the future time period in the third labels and the output of the change prediction layer, where the first loss function may include a loss function using a regression problem such as mean squared error (MSE), or the like. Parameters of the assessment layer may be iteratively updated based on the first loss function, and parameters of the change prediction layer may be iteratively updated based on the second loss function until the first loss function and the second loss function are less than a threshold or converge, or a training period reaches a threshold, etc., so as to obtain a trained first model. The second loss function may include a root mean square error, etc.

In some embodiments, the gas company management platform may determine whether a sample assessment result of a training sample satisfies a first preset condition; in response to determining that the sample assessment result does not satisfy the first preset condition, assign a first weight to the training sample; and in response to determining that the sample assessment result satisfies the first preset condition, assign a second weight to the training sample.

The sample assessment result refers to an assessment result obtained after the sample first usage information and the sample second usage information in the third training samples are input into the assessment layer.

The first preset condition refers to a determination condition for determining a weight of a training sample. The first preset condition may be preset by the system or manually. For example, the first preset condition may include, but is not limited to, the sample assessment result being less than a threshold (e.g., 0.8, etc.). The weight refers to a weight percentage of a loss term corresponding to the training sample in the loss function.

The first weight refers to a weight corresponding to the training samples of which sample assessment results do not satisfy the first preset condition.

The second weight refers to a weight corresponding to training samples of which sample assessment results satisfy the first preset condition. It should be noted that the second weight may be greater than the first weight.

In some embodiments, the gas company management platform may randomize the second weight and determine the first weight to be (1−the second weight). It should be noted that the second weight may be a value greater than 0.5 and less than 1, which may be set according to the actual needs. In some embodiments, the gas company management platform may also continuously monitor the performance of the change prediction layer with different candidate second weight settings on a validation set using processes such as cross-validation, determine a candidate second weight corresponding to the change prediction layer with the best performance as the second weight, and determine the first weight to be (1−the second weight). In some embodiments, the gas company management platform may also periodically adjust the first weight and the second weight to improve the robustness and generalization performance of the first model.

In some embodiments, the gas company management platform may also deeply analyze the training samples corresponding to the sample assessment results that satisfy the first preset condition to understand the cause of the difference between the sample first usage information and the sample second usage information in the training samples, such as user misreporting, equipment failure, an environmental change, etc., to improve the ability of the change prediction layer to recognize the cause of the difference.

In some embodiments of the present disclosure, by assigning different weights to the training samples, special attention can be paid to the training samples with poor sample assessment results, such that the change prediction layer can more systematically deal with the training samples with poor sample assessment results, thereby optimizing the training effect of the first model, and improving the reliability of the first model in practical applications.

According to some embodiments of the present disclosure, the assessment results corresponding to different usage information and the second change trend can be accurately and efficiently predicted through different layers in the first model, thereby improving the efficiency of data processing, and facilitating the subsequent accurate determination of the target gas user.

In some embodiments of the present disclosure, by predicting the second change trend using the first model, the accuracy of the predicted second change trend can be improved, which is conducive to the subsequent determination of the target gas user.

Figure 5:
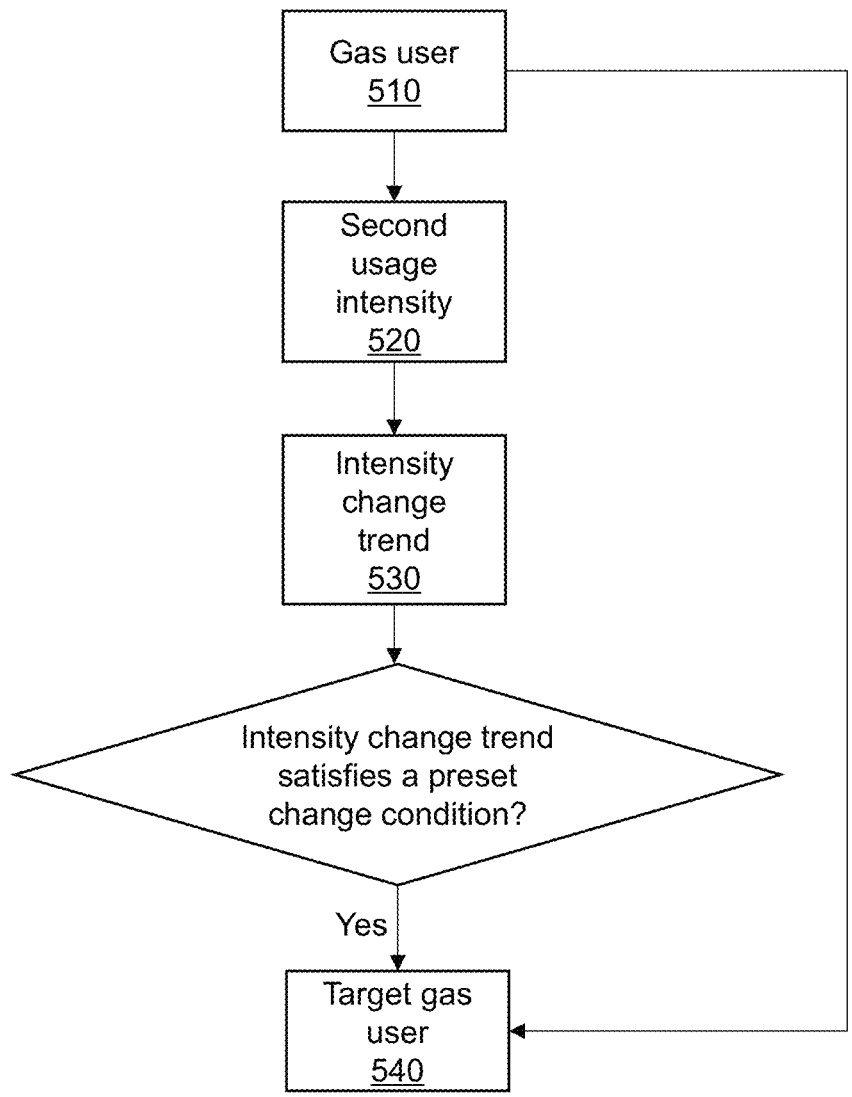
FIG. 5 is a schematic diagram illustrating an exemplary process of adjusting a target gas user according to some embodiments of the present disclosure.

FIG. 5 is a schematic diagram illustrating an exemplary process of adjusting a target gas user according to some embodiments of the present disclosure.

In some embodiments, a gas company management platform may obtain an intensity change trend 530 of a gas filling container corresponding to a gas user 510 based on a second usage intensity 520 of the gas filling container corresponding to the gas user; and in response to determining that the intensity change trend satisfies a preset change condition, add the gas user 510 corresponding to the intensity change trend as a target gas user 540. More descriptions regarding the gas user 510 may be found in FIG. 1 and related descriptions thereof, and more descriptions regarding the target gas user 540 may be found in the descriptions of FIG. 2 and FIG. 3.

The second usage intensity 520 refers to an intensity with which the gas user uses the gas filling container, and may be configured to measure a usage situation of the gas filling container of the gas user. The second usage intensity may be obtained in a similar manner as a first usage intensity, which may be found in the related descriptions of the operation 340 in FIG. 3.

The intensity change trend 530 refers to a trend for characterizing the change in the second usage intensity of the gas filling container corresponding to the gas user changes over time. For example, the intensity change trend may characterize an increase, decrease, or stabilization of the second usage intensity, etc.

In some embodiments, the gas company management platform may obtain the intensity change trend of the gas filling container corresponding to the gas user based on the second usage intensity of the gas filling container corresponding to the gas user in various ways.

For example, the gas company management platform may determine a ratio of a second usage intensity difference to the second usage intensity of a previous time period as the intensity change trend. The second usage intensity difference refers to a value of the second usage intensity of the current time period minus the second usage intensity of the previous time period. More descriptions regarding the previous time period may be found in FIG. 3 and related descriptions thereof.

The preset change condition refers to a condition for determining whether the gas user becomes the target gas user. The preset change condition may be preset manually or by system default. The exemplary preset change condition may include that the intensity change trend continues to increase over the preset time period, etc.

In some embodiments, the preset change condition may include that the intensity change trend is greater than an intensity threshold.

The intensity threshold refers to a threshold condition for determining whether the intensity change trend satisfies the preset change condition.

In some embodiments, the intensity threshold may be determined based on a historical second usage intensity. For example, the gas company management platform may determine the intensity threshold based on the historical second usage intensity through a sixth preset rule. The historical second usage intensity may be obtained based on historical data. The sixth preset rule refers to a preset rule for determining the intensity threshold. The exemplary sixth preset rule may include that the greater the standard deviation of the historical second usage intensity, the smaller the intensity threshold.

In some embodiments of the present disclosure, the intensity threshold is obtained based on the historical second usage intensity, and then whether the intensity change trend satisfies the preset change condition is determined accordingly, such that the determination accuracy can be improved, and the determination error can be reduced.

In some embodiments, in response to determining that the intensity change trend satisfies the preset change condition, the gas company management platform may add the gas user corresponding to the intensity change trend as the target gas user.

In some embodiments of the present disclosure, the intensity change trend is determined based on the second usage intensity of the gas user, and gas users with anomaly intensity change can be screened out, which is conducive to expanding the scope of determining the target gas users, and improves the safety of filling gas supervision.

Some embodiments of the present disclosure provide a non-transitory computer-readable storage medium comprising computer instructions that, when read by a computer, may direct the computer to implement the method for filling gas safety supervision based on the smart gas IoT.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for filling gas safety supervision based on smart gas Internet of Things (IoT), wherein the method is implemented by a gas company management platform of a system for filling gas safety supervision based on smart gas Internet of Things (IoT), the method comprising:

obtaining monitoring data of a gas filling container based on an equipment object platform, the gas filling container including an electronic monitoring device, and the monitoring data being monitored data related to a status of the gas filling container;

obtaining usage information of the gas filling container based on the equipment object platform, the usage information being data related to the gas filling container during actual use;

determining, based on the monitoring data and the usage information, a usage index of the gas filling container in different time periods through a first preset rule, and sending the usage index to a gas user platform, the usage index being a comprehensive indicator that assesses a use status of the gas filling container and a level of risk, and the first preset rule being a rule preset for determining the usage index;

determining a target gas user based on the usage index, including:

obtaining maintenance data of the gas filling container;

determining an index change trend based on a first change trend, the maintenance data, the monitoring data, and the usage information, the first change trend being determined through the usage index, the first change trend being a change trend of the usage index from a previous time period to a current time period;

determining a potential gas user based on the index change trend and a first change threshold; and determining the target gas user based on a first usage intensity of a gas filling container corresponding to the potential gas user, the first usage intensity being a usage intensity of the gas filling container by the potential gas user;

sending, based on the gas user platform, container replacement information to the target gas user, and sending a parameter adjustment instruction to the electronic monitoring device of the gas filling container corresponding to the target gas user, the parameter adjustment instruction being configured to adjust a monitoring parameter of the electronic monitoring device; and interacting with a public user platform based on a government safety supervision sensor network platform, a government safety supervision management platform, and a government safety supervision service platform, and displaying the target gas user and the container replacement information based on the public user platform.

2. The method of claim 1, wherein the usage information includes first usage information and second usage information, the index change trend includes a second change trend, and determining the second change trend includes:

determining the second change trend through a first model based on the first usage information and the second usage information, the first model being a machine learning model; wherein the first usage information is usage information actively uploaded by a gas user, the second usage information is usage information of the gas filling container monitored by the electronic monitoring device, and the second change trend refers to change rates of a plurality of predicted usage indexes over a future time period.

3. The method of claim 1, wherein the displaying the target gas user based on the public user platform includes:

determining, based on the monitoring data and/or the usage information, whether the monitoring data and/or the usage information satisfy a preset data condition through a second model, the second model being a machine learning model; and in response to determining that the monitoring data and/or the usage information satisfy the preset data condition, adjusting the target gas user, interacting with the public user platform based on the government safety supervision sensor network platform, the government safety supervision management platform, and the government safety supervision service platform again, and displaying an adjusted target gas user based on the public user platform.

4. The method of claim 1, wherein the obtaining usage information of the gas filling container based on the equipment object platform includes:

obtaining first usage information based on interaction between a gas company service platform and the gas user platform; and obtaining second usage information updated by the equipment object platform based on interaction between a gas company senser network platform and the equipment object platform.

* * * * *